Feb. 6, 1923.
S. H. SHERWOOD ET AL.
CRATE.
FILED APR. 12, 1922.
1,444,711.
3 SHEETS—SHEET 1.
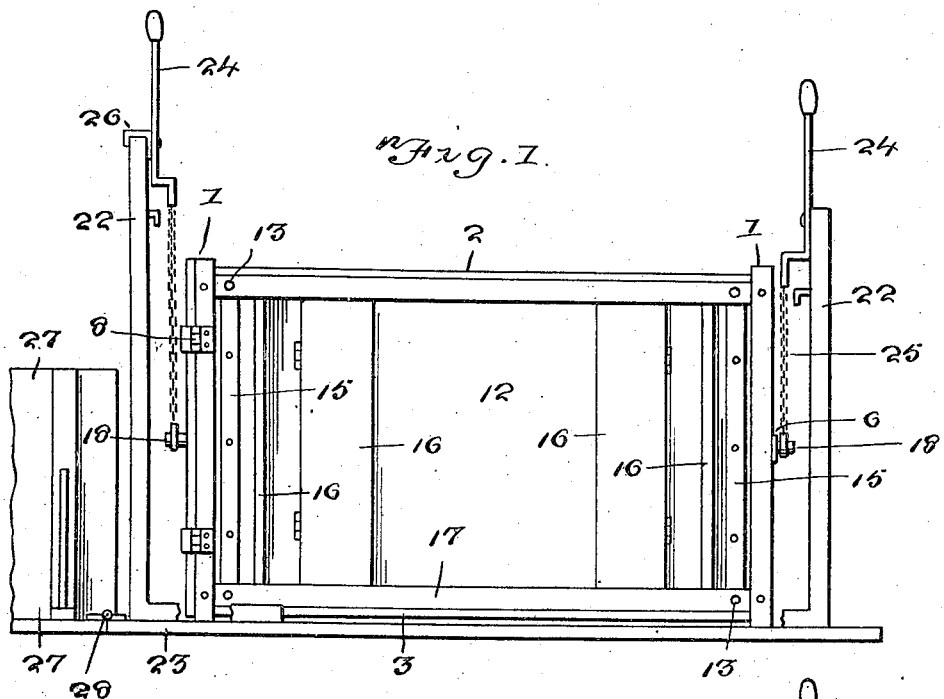
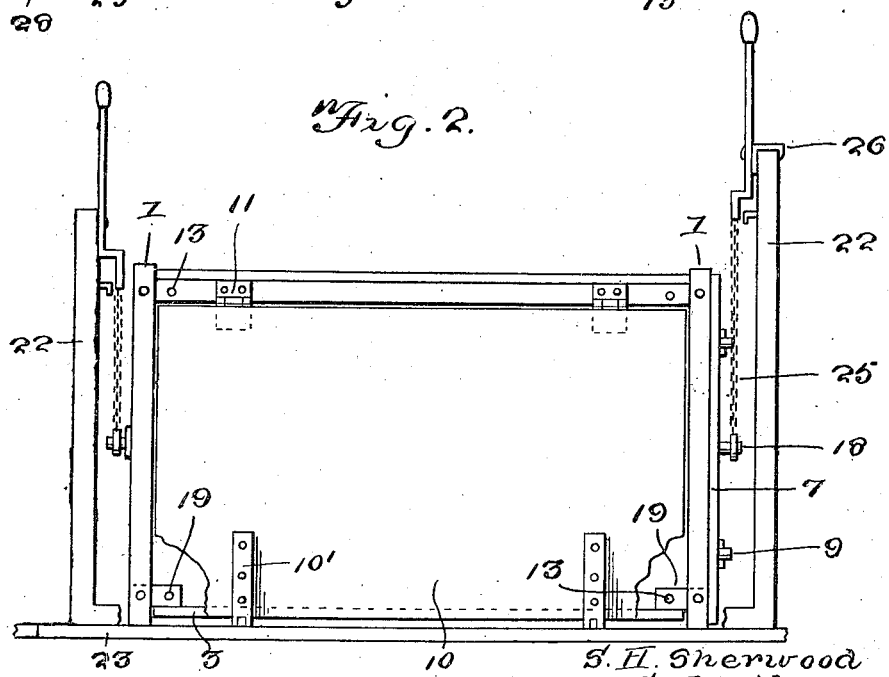
WITNESS:
E. R. Ruppert.
S. H. Sherwood
A. G. Barth
INVENTOR
BY Victor J. Evans Feb. 6, 1923.
S. H. SHERWOOD ET AL.
CRATE.
FILED APR. 12, 1922.
1,444,711
3 SHEETS—SHEET 2
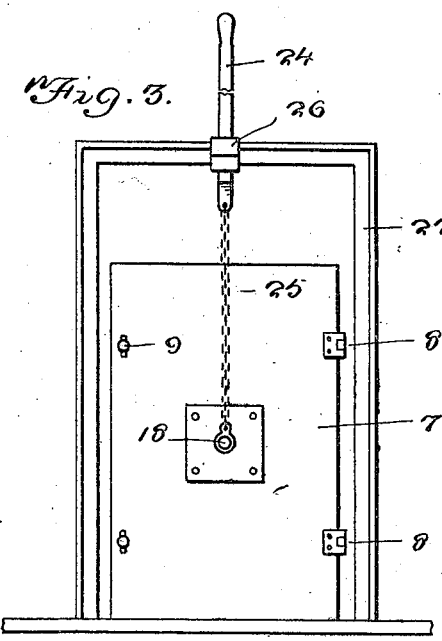
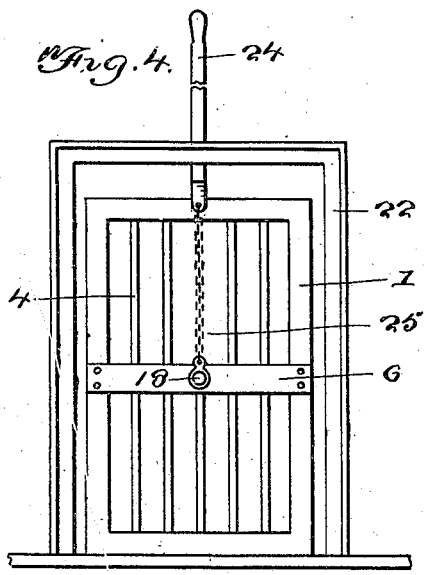
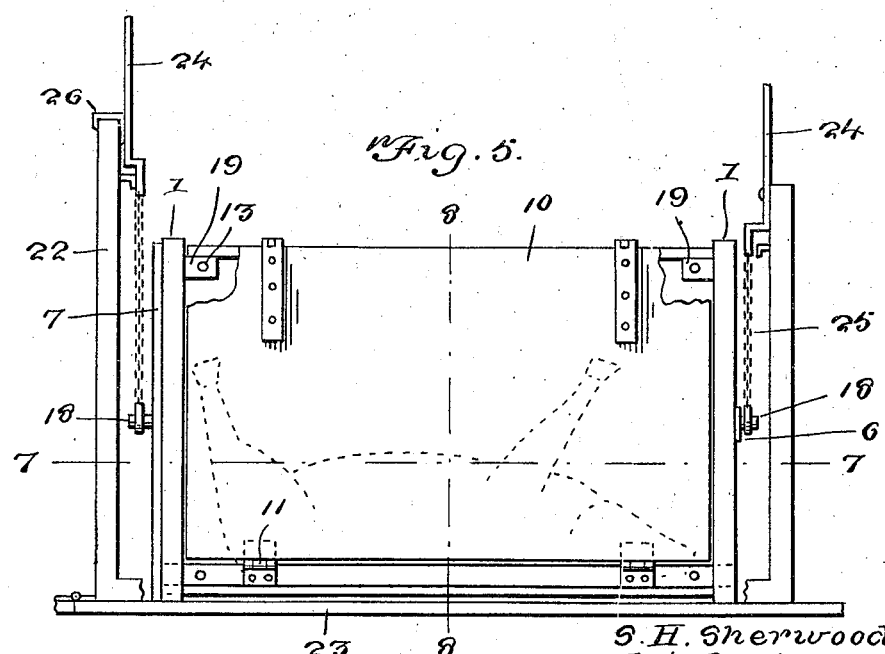
S. H. Sherwood
A. G. Barth
INVENTOR
BY Victor J. Evans
ATTORNEY
WITNESS:

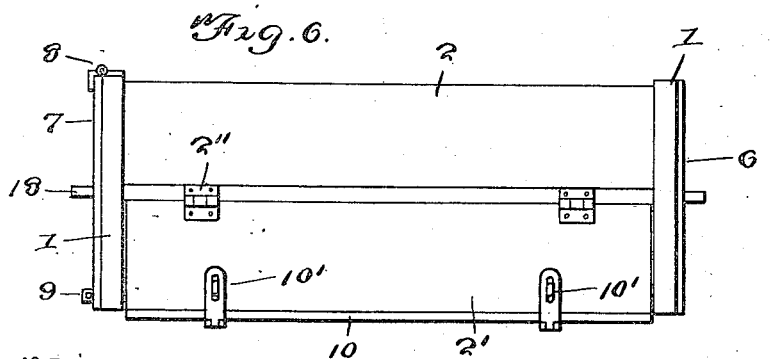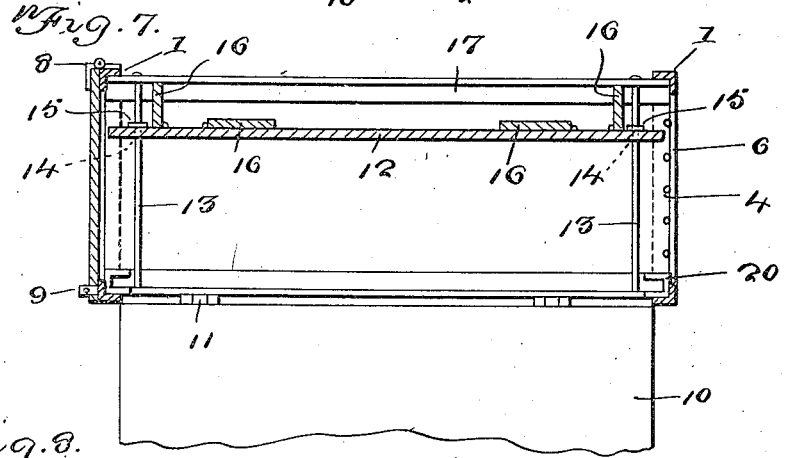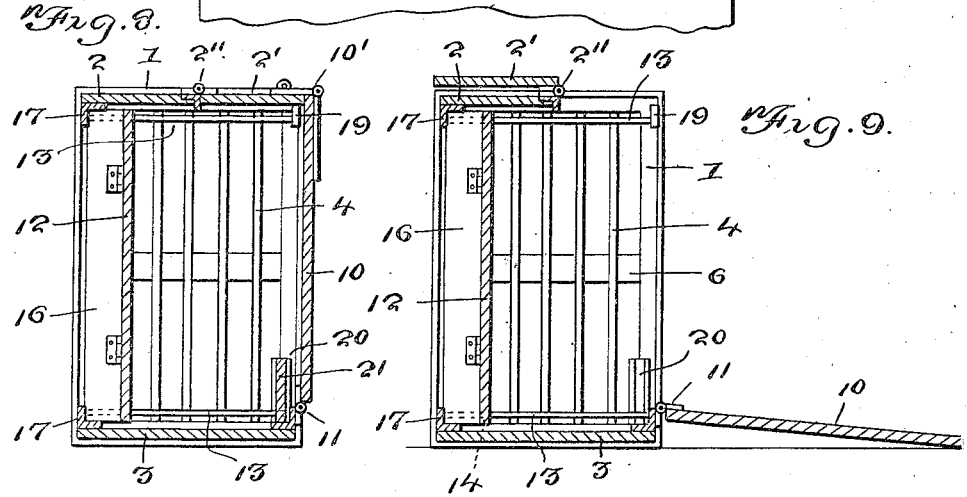

Patented Feb. 6, 1923.

1,444,711

UNITED STATES PATENT OFFICE.

STEPHEN H. SHERWOOD AND ALBERT G. BARTH, OF PAWPAW, ILLINOIS.

CRATE.

Application filed April 12, 1922. Serial No. 551,813.

*To all whom it may concern:*

Be it known that we, STEPHEN H. SHERWOOD and ALBERT G. BARTH, citizens of the United States, residing at Pawpaw, in the county of Lee and State of Illinois, have invented new and useful Improvements in Crates, of which the following is a specification.

This invention relates to a hog crate, the general object of the invention being to provide a crate for facilitating the treatment of hogs, such as the vaccination of them, ringing of old hogs and the trimming of their feet.

Another object of the invention is to provide means whereby the crate can be turned upside down to place the hog upon its back so that it can be treated without tying and throwing it.

A further object of the invention is to provide means whereby the crate can be made smaller to suit different sizes of hogs.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a side view of a crate constructed, in accordance with our invention, with the means for raising the same to turn it upside down.

Figure 2 is a view looking towards the opposite side of Figure 1, with parts broken away.

Figure 3 is an end view of the device.

Figure 4 is a view of the opposite end.

Figure 5 is a side view, with parts broken away, showing the crate inverted.

Figure 6 is a plan view of the crate.

Figure 7 is a section on line 7—7 of Figure 5 with the side swung downwardly.

Figure 8 is a section on line 8—8 of Figure 5 with the side closed.

Figure 9 is a similar view with the top and side open.

As shown in these views the crate comprises a rectangular frame formed of angle bars 1 to which the top 2 and bottom 3 are secured. The top comprises a hinged section 2′ which is hinged to the stationary section, as shown at 2″. One end of the crate is formed of the bars 4 which are spaced apart to leave openings, this end being strengthened by the central cross piece 6. A door 7 is located at the other end, said door being hinged to one of the end pieces of the frame, as shown at 8, and having suitable means for fastening it to the opposite side of the frame, as shown at 9. The side 10 is hinged at its lower edge to one of the side pieces of the frame, as shown at 11. This side 10 is provided with latch means 10′ for securing it to the hinged section 2′ of the top when the crate is to be closed. The opposite side 12 is slidably mounted on the rods 13 by having holes 14 therein through which the rods pass. Reinforcing pieces 15 are secured to the ends of the side 12 and have holes therein which register with the holes in the side. Thus by moving the side inwardly and outwardly upon the rods the crate can be adjusted as to size to suit different sizes of hogs. Strips 16 of different widths are hinged to the side 12 for holding the same in adjusted position. When these strips rest flat the crate is of its maximum size. When the crate is to be reduced in size the narrow strips are swung outwardly and when the crate is to be still further reduced in size the wide strips are swung outwardly. These strips engage the parts 17 of the frame which prevent the side 12 from being entirely removed from the crate. Pintles 18 extend outwardly from the center of the door and the stationary end of the crate, these pintles being adapted to act as pivots for permitting the crate to be turned over to place the hog upon its back, thus rendering him helpless and permitting him to be treated without difficulty. The side 10, when the crate is inverted, has its hinged edge at the bottom so that it can be dropped, thus permitting the hog to be treated from the side and also permitting him to be rolled out of the crate after treatment.

In order to permit free access to the interior of the crate to reach the hog therein, a space is left in the frame at the junction of the top with the hinged side, stud pieces 19 being provided for supporting the rods 13 and the hinged section 2′ of the top rests upon these pieces when the same is in closed position. We also provide guideways 20 at the ends of the crate, adjacent the hinged part of the side 10, for receiving a board 21 which acts to prevent the hog from rolling out of the crate. This board is removed after the hog has been operated upon so that he can be rolled out of the crate.

The means for raising and lowering the crate consists of a pair of frames 22 which are supported upon the base 23 upon which the crate is supported. Each frame carries a pivoted lever 24 which is adapted to be connected with the pintles 18 by the chains and hooks 25. Thus by swinging the levers upon the pivots the crate can be raised so that it can be inverted, and then lowered so that the hog will rest upon his back, as shown in Figure 5. In order to permit the door to be opened without detaching it from the lever we make the lever, which is connected with the door, slidable on its frame by pivoting it to a bracket 26 which is slidably mounted on the top of the frame.

In order to permit the hog to be driven into the crate we provide a chute 27 which is supported on the platform 23 and we may make this platform of two parts which are hinged together, as at 28.

By opening the door 7 the hog can be driven into the crate, the slatted opposite end of the crate making it easy to drive the hog into the crate as he can see through the same.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A hog crate comprising a frame, top and bottom pieces connected with the frame, a door hinged to one end of the frame, a side hinged to the frame, means for permitting the crate to be inverted to place the hog upon its back, such means including pintles in the stationary end piece and in the door.

2. Means for treating hogs comprising a crate having pintles at its ends, a pair of upright frames, a lever fulcrumed in each frame and a chain on each lever for engaging the pintle for permitting the crate to be raised to invert the same and then lowered.

3. A crate of the class described comprising a rectangular frame, top and bottom pieces connected with said frame, a frame consisting of laterally aranged bars adjacent the ends thereof, a side having openings therein to receive said bars for slidably supporting said side, strips of different widths being hinged to said side for holding the same in adjusted position, and a second side connected with the frame, a door provided at one end of the crate and a stationary end piece at the opposite end, pintles extending outwardly from the center of the door and the stationary end of the crate for inverting the latter, guideways provided at the ends of the crate adjacent the hinged side and a board engaging said guideways to prevent the hog from rolling out of the crate and means for raising and lowering said crate.

In testimony whereof we affix our signatures.

STEPHEN H. SHERWOOD.
ALBERT G. BARTH.